March 24, 1970   A. J. BAGGOTT   3,502,980
DIGITAL MAXIMUM DEMAND INDICATOR FOR ELECTRIC POWER CONSUMPTION
Filed Nov. 21, 1966
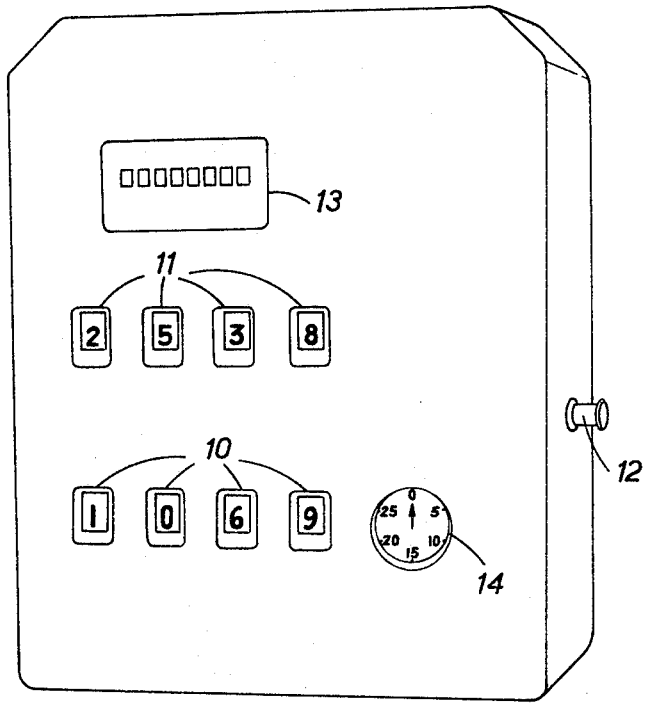
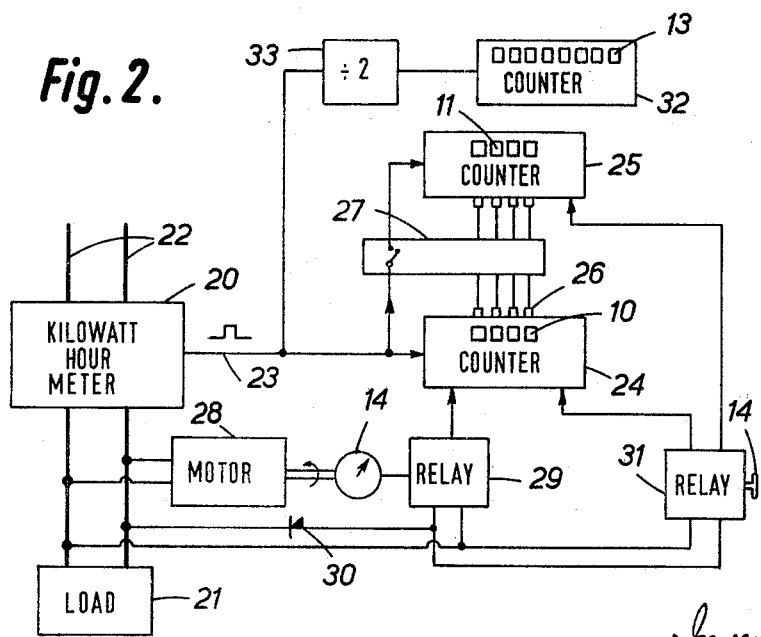
Inventor
Albert Jefferies Baggott
By Cushman, Darby & Cushman
Attorneys

United States Patent Office 3,502,980
Patented Mar. 24, 1970

3,502,980
DIGITAL MAXIMUM DEMAND INDICATOR FOR ELECTRIC POWER CONSUMPTION
Albert Jefferies Baggott, Oxted, Surrey, England, assignor of one-half to London Electricity Board, London, England, a British corporation
Filed Nov. 21, 1966, Ser. No. 595,947
Claims priority, application Great Britain, Nov. 19, 1965, 49,330/65
Int. Cl. G01r *19/16*
U.S. Cl. 324—103                    12 Claims

ABSTRACT OF THE DISCLOSURE

This specification discloses a maximum demand indicator for an electricity supply consumer where the tariff includes a charge in respect of the maximum consumption of power over a predetermined, possibly controllable, short period. In one embodiment, electric pulses, representing units of power consumed, are obtained from a kilowatt-hour meter and fed to a first counter. This counter is periodically re-set to zero either by a timer or from a central control, typically every half-hour. The first counter thus counts the total power supplied in each such integrating period. A second counter is arranged to continue counting pulses only when the first counter reaches the total in the second counter. The second counter thus records the maximum value reached by the first counter during any integrating period. At the end of an account period, e.g. at the end of each month, either manually or automatically on interrogation, and both counters are then simultaneously re-set to zero.

---

This invention relates to maximum demand indicators for electricity power supply systems.

The charge made for supplying electric power may include an element based on the maximum demand during the period of the account and, for this purpose, it is necessary to provide an indicator which will record the maximum demand during the account period. This maximum demand is determined by integrating the power consumption over a short period typically half-an-hour. Heretofore maximum demand indicators have been of the analogue type having a driving element, e.g. a short pointer, which is gradually rotated during the integrating period and reset to zero at the end of each such period. This driving element is arranged to move a further pointer over a scale. This further pointer, however, is not automatically reset but remains in the position to which it has been driven. At the end of each integrating period, the driving element is reset and will not start to drive the further pointer unless and until the integrated demand exceeds the value to which the further pointer has previously been driven. Thus the further pointer indicates on the scale, the maximum demand during any preceding integrating period. At the end of the accounting period, typically every month, the further pointer is reset to zero so that it will then record the maximum demand during the next account period. This type of maximum demand indicator suffers from certain disadvantages. It usually takes several seconds to reset the driving element at the end of each integrating period, during which period the power consumption is not integrated. The instrument is difficult to read and, because it is used as a basis of a charging, the charge has to be made to the nearest division on the scale below the maximum demand indicated by the pointer. These drawbacks lead to undercharging which might be of the order of 1%. Since maximum demand indicators are normally only employed in metering the supply to very large consumers, such losses of revenue may be quite substantial. Furthermore, the lack of clarity in the reading is very undesirable in meters which are used as a basis for charging consumers.

According to the present invention, a maximum demand indicator for an electricity supply comprises first and second counters, means operative in accordance with the consumption of units of power for driving the first counter, and reset means arranged to reset the first counter to zero periodically, the second counter being interconnected to the first counter to be driven thereby when the sum counted by the first counter is equal to that on the second counter. The means operative in accordance with the consumption of units of power may comprise a kilowatt hour meter. This may be arranged to drive the first counter mechanically but preferably it is arranged to provide electrical pulses representative of units of power and these pulses drive or control the driving of the first counter. The second counter in this case may be electrically interconnected to the first counter so that the aforesaid pulses are also fed to the second counter when the sum counted by the first counter is equal to that on the second counter.

The reset means may be a synchronous motor or other timing device or may be a remotely controlled actuator. A remotely controlled device has the advantage that the integrating time periods may be centrally controlled and can readily be altered simultaneously as may be required.

The second counter may comprise a binary scaler or an electro-mechanical digital indicator. Preferably means are provided for indicating the total on said second counter numerically in units, tens and hundreds and possibly to a higher order. Alternatively or additionally, however, a printing head or punched tape read-out may be provided. Most conveniently both counters are arranged to provide a direct numerical indication.

With this construction, during any integrating period, typically a period of half-an-hour, the first counter integrates the total consumption over this period. If, during this period, the first counter should reach the magnitude indicated on the second counter, the two counters operate together until the end of the integrating period. The first counter is then reset to zero and starts integrating again. The second counter however retains the reading to which it has been set. It will thus be seen that the second counter will indicate the maximum demand during any previous integrating period providing a direct digital indication of the magnitude of maximum demand. This may be to any required degree of accuracy by providing the appropriate number of numerical indicators in each counter and it is readily possible to obtain an indication to these or more significant figures.

When the meter is read at the end of the account period, the second counter is set again to zero and for this purpose there may be provided a manual reset button.

The pulses for operating this maximum demand indicator may conveniently be obtained from the total consumption meter (kilowatt-hour meter) which is necessarily provided for measuring the total power consumption over the account period. Contacts may be provided on the total consumption meter to give a pulse for each unit of power consumed or a suitable transducer e.g. an inductive pick-off, may be operated by the consumption meter. Conveniently if the integrating period is half-an-hour, such pulses may be provided for each half kilowatt-hour so that each single pulse will drive the first counter on one unit to represent one kilowatt of demand. Obviously however choice of the magnitude of the units of consumption to be employed will depend on the magnitude of the maximum demand to be indicated. If contacts on the kilowatt-hour meter are employed preferably the pulses are arranged to operate a relay so as to minimize the current passing through these contacts. Such a relay may also be convenient if a transducer is employed. The power supply for this relay may conveniently be taken from a power pack supplying the direct current power for the maximum demand indicator.

The counters are preferably drum-type counters with numerical indications around the cylindrical surface of each drum, the drums being arranged co-axially in line to be viewed through a window or windows in the casing of the instrument so that one set of figures can be read directly from the drums through the window or windows. A suitable electro-servo mechanism may be provided for stepping on the units drum one step for each pulse received from the relay and for stepping on each successive drums when the preceding drum passes from nine to zero.

Conveniently the second counter is similar in construction to the first counter. The drums on the two counters may have electrical contacts co-operating with brushes or may have other forms of transducers which are interconnected so that, when both sets of counters give the same reading, a circuit is completed for passing pulses to the second counter as well as to the first counter each time the aforementioned relay is operated.

The aforementioned reset means may be arranged to drive a contact device to complete a circuit for a short time periodically for example every half-hour to reset the first counter. Means may be provided for adjusting the duration of this integrating period if so desired.

For resetting the first counter to zero, there may be provided a set of contacts with a co-operating brush on each of the counter drums. These contacts and brushes are arranged to provide an open circuit at zero values for the various drums but, in all the other positions, to complete a circuit and the contact operated by the synchronous motor may be arranged to supply half-wave rectified alternating current through these further contacts and brushes to the drum operating servo-systems so that the various drums are set to zero in a time period which, at the maximum, will be nine-cycles of the alternating current supply. The rapid resetting of the counter provides a further advantage in that it enables loss of counting during the resetting period to be avoided; it is merely necessary to ensure that the pulses from the total consumption meters are of longer duration than the resetting period. A similar arrangement may be employed for resetting the second counter at the end of the account period and conveniently the aforementioned manual push button is arranged to operate a relay so that resetting pulses are applied to both counters simultaneously. The push button would be suitably sealed so that it can only be operated by an authorized meter reader.

The following is a description of one embodiment of the invention, reference being made to the accompanying drawings, in which:

FIGURE 1 is a perspective view of a maximum demand indicator; and

FIGURE 2 is a block diagram illustrating the construction of the maximum demand indicator of FIGURE 1.

Referring to FIGURE 1, there is shown a maximum demand indicator for installation on the premises of an electric supply consumer who has power supplied under a tariff including a charge in respect of the maximum power demand over a predetermined short period. This period may be remotely controlled but the particular embodiment illustrated is for use in conjunction with a tariff structure where this period is constant. In this case, the period might typically be a period of 30 minutes. This maximum demand indicator is employed in conjunction with a total power consumption meter, i.e., a kilowatt-hour meter (not shown in FIGURE 1) which gives impulses for each unit, typically each ½ kwh., of power consumed. These pulses may be obtained from contacts or from an inductive pick-off on the kilowatt-hour meter.

The maximum demand indicator of FIGURE 1 has a counter 10 which displays, in decimal digital form, the number of these pulses during the time period elapsed since this counter was last re-set to zero. As will be explained later, this counter 10 is re-set periodically after each of said predetermined short periods, that is every 30 minutes in this particular embodiment. A second counter 11 is so connected to the first counter 10 that, when the two counters read the same, the second counter 11 operates in synchronism with the first counter 10. The second counter however is not re-set every 30 minutes and thus retains the highest value to which it has previously been driven. It thus serves to record the maximum consumption in any half hour during an account period. At the end of an account period, the meter is read and then both counters 10 and 11 are simultaneously set to zero by pressing a button 12 which is suitably sealed, in the known manner, so that it cannot be operated by an unauthorised person without leaving evidence of such operation. In the maximum demand indicator of FIGURE 1, it is convenient to display the total power consumption and these pulses are therefore fed to an integrating counter, conveniently a decimal digital counter 13.

If the consumer wishes to limit his maximum demand, he can note on the counter 10 the integrated total during the period since the counter was last re-set. For convenience, a timing indicator 14 is provided for indicating the time elapsed since the counter 10 was last re-set.

Referring now to FIGURE 2, there is shown diagrammatically a kilowatt hour meter 20 connected to measure the total power supplied to a consumer's load 21 from incoming supply mains 22. This kilowatt hour meter 20 provides output pulses on a lead 23, these pulses conveniently being of rectangular waveform and of a duration of at least 0.2 second, one pulse being produced for each ½ kwh. of power consumption. These pulses are fed to an electro-mechanical counter 24 incorporating the decimal digital display 10 of FIGURE 1. Conveniently the display is provided by a number of drum-type indicators with numbers on their cylindrical faces, the drums being arranged co-axially so that the numbers appear in line as shown in FIGURE 1. The units drum is stepped on one step for each pulse on the lead 23 and the various successive drums for the digits of higher significance are each stepped on one step when the drum of next lower significance changes from nine to zero. A second similar counter 25 includes the display 11 of FIGURE 1. The two counters 24, 25 are interconnected so that the counter 25 is driven only when the indicated counts on the two displays 10, 11 are identical. For this purpose contacts on the various drums of the two displays may be interconnected to complete a drive circuit when the displayed counts are identical. To reduce loading on the drums, inductive transducers are preferred. In FIGURE 2, these transducers 26 are interconnected as shown at 27 to control the drive to the counter 25 by the pulses on the lead 23.

The counter 24 is periodically re-set; in this particular embodiment, it is re-set every half hour by a timing device consisting of a synchronous motor 28 which drives the aforementioned indicator 14 (FIGURE 1) and also for a short time every half hour by means of a microswitch operates a relay 29 for resetting the counter 24 to zero. In this particular embodiment, the relay 29 has a contact which is closed to apply half wave rectified alternating current from a rectifier 30 to the drive input for each drum of the counter so that, with a maximum of nine half cycles of the alternating supply, the counter 24 is driven to zero. The time required for this is less than the duration of a pulse on lead 23 and hence the short period required for resetting of the counter does not entail any loss in the next count.

It will be noted that since the counter 24 is re-set every half hour and since the drive pulses represent ½ kwh., then at the end of a half hour period, the count registered on the counter 24 and displayed on thet display 10 is the mean power demand over that half hour period.

The counter 25 is not re-set after each half hour. Thus it retains the highest total recorded in any preceding half hour period. If at any time the counter 24 reaches this total, the counters 24 and 25 continue counting together until the end of the half hour period when the counter 24 is re-set and the counter 25 retains the new total.

At the end of an account period, typically every month, after the total on the counter 25 has been recorded, the counter 25 is re-set to zero. For this purpose, the press-button 12 of FIGURE 1 operates a relay 31 (FIGURE 2) which applies the re-set drive signals to both counters 24 and 25 so that they are both re-set to zero.

The relays 29 and 31 are preferably arranged, during a resetting operation, to interrupt the normal drive to the counter 24 from the lead 23.

Since pulses representing units of consumption have to be available at this maximum demand indicator, it is convenient to provide a further counter 32 which counts these pulses and thus indicates total power consumption. This may also be an electro-mechanical counter, conveniently of the drum-type. This counter may have to indicate a much higher numerical total than the first and second counters and must have the appropriate number of digit indicators. Most conveniently this further counter is arranged to give a digital indication directly of the number of kilowatt hours and, in the particular embodiment illustrated, the pulses on lead 23 representing ½ -kwh. units are fed through a binary divider stage 33 before being applied to the counter 32. Such a power consumption indicator provides a convenient way of checking the operation of the counter 24, since the consumer can readily check his consumption over any given period. The maximum demand indicator can then be put in some suitable position not necessarily near the total consumption meter where it is more convenient for observation and checking by the consumer.

The counter 25 may be arranged to give an indication at a remote point. It may be arranged to drive slave devices which can be used for load control or tariff adjustment purposes. The resetting of the counters 24, 25 at the end of the account period may be effected from a remote point. To give a record of the readings, the counter 25 may be arranged to drive a printing head or a paper tape punch.

The particular embodiment described above makes use of a synchronous motor as a timing device for resetting the counter 24. Alternatively, however, the resetting may be effected by a remotely controlled actuator. This permits of the resetting of all or a number of maximum demand indicators remotely from a central station and thus makes possible the simultaneous change of duration of the integrating period. This permits of more sophisticated tariff structure than have heretofore been employed and reflecting more closely the true cost of generating power to meet the peak loads of consumers.

I claim:
1. A maximum demand indicator for an electricity supply comprising:
   first and second electrical pulse counters, at least the second counter having a visual digital count indicator,
   means for producing electrical pulses in accordance with the consumption of units of power,
   means for feeding said pulses to said first counter to be counted thereby,
   means for periodically re-setting said first counter to zero,
   circuit means including switch means for feeding said pulses to said second counter, and
   means for comparing the counts on said first and second counters to that when the count on said first counter reaches the sum counted on said second counter said switch means is closed so that said pulses are fed to said second counter to be counted thereby.

2. A maximum demand indicator as claimed in claim 1 wherein said means for re-setting said first counter to zero comprises a synchronous motor forming a timer.

3. A maximum demand indicator as claimed in claim 1 wherein said means for re-setting said first counter to zero comprises a remotely controlled actuator.

4. A method of determining the maximum demand from an electrical supply to a load during a given time divided into a number of monitoring periods comprising the steps of:
   detecting the power transmitted to said load from said supply,
   producing electrical pulses each representing a unit of energy transmitted to said load,
   feeding said pulses to a first counter to be counted,
   comparing the counts on a first and second counter,
   feeding said pulses to said second counter after the count on said first counter reaches the count on said second counter so that said second counter records the largest count on said first counter during said given time, and
   re-setting said first counter to zero at the end of each said monitoring period.

5. A method as in claim 4 including the step of re-setting said second counter to zero at the end of said given time.

6. A maximum demand indicator as claimed in claim 1 wherein the second counter is an electro-mechanical digital indicator for indicating numerically in decimal digits.

7. A maximum demand indicator as claimed in claim 1 wherein both counters are drum-type counters with numerical indicators around the cylindrical surface of each drum, the drums being arranged coaxially in line.

8. A maximum demand indicator as claimed in claim 1 wherein said re-set means comprises a switch periodically closed to complete a circuit for applying half wave rectified alternating current as driving pulses to the first counter.

9. A maximum demand indicator as claimed in claim 8 wherein the first counter is a decimal digit counter and wherein re-set pulses are applied to the indicators of each significant digit to drive each indicator to the zero position.

10. A maximum demand indicator as claimed in claim 1 wherein manually operable means are provided for re-setting both counters to zero simultaneously.

11. A maximum demand indicator as claimed in claim 1 wherein a further counter is provided for indicating total power consumption.

12. A maximum demand indicator as claimed in claim 11 wherein said further counter includes a decimal digital count display.

References Cited
UNITED STATES PATENTS

| | | | |
|---|---|---|---|
| 2,145,069 | 1/1939 | Beusch et al. | 324—103 |
| 3,092,318 | 6/1963 | Ham | 324—103 XR |

RUDOLPH V. ROLINEC, Primary Examiner

ERNEST F. KARLSEN, Assistant Examiner

U.S. Cl. X.R.

235—92